(12) United States Patent
Uratani

(10) Patent No.: US 7,503,542 B2
(45) Date of Patent: Mar. 17, 2009

(54) REMOVABLE MARKING DEVICE FOR A MOLD

(75) Inventor: Hideki Uratani, Nishinomiya (JP)

(73) Assignee: Uratanishoji Kabushiki Kaisha (Japan Corporation), Nishiyodogawa-ku, Osaka, Osaka (JP)

( * ) Notice: Subject to any disclaimer, the term of this patent is extended or adjusted under 35 U.S.C. 154(b) by 0 days.

(21) Appl. No.: 11/644,151

(22) Filed: Dec. 22, 2006

(65) Prior Publication Data

US 2007/0145232 A1    Jun. 28, 2007

Related U.S. Application Data

(63) Continuation-in-part of application No. 11/211,366, filed on Aug. 24, 2005, now Pat. No. 7,171,894.

(30) Foreign Application Priority Data

Sep. 13, 2006    (JP)    ............... 2006-248731

(51) Int. Cl.
  *B29C 33/00*    (2006.01)
  *B41F 1/07*    (2006.01)
(52) U.S. Cl. .............. 249/103; 425/182; 425/192 R; 425/193; 425/195; 425/190; 249/104; 101/4
(58) Field of Classification Search ......... 249/102–104, 249/140, 182; 425/173, 182, 183, 186, 188, 425/192 R, 468, 577, 190, 193, 195; 164/229, 164/235, 236, 412; 101/4; 116/311–312
See application file for complete search history.

(56) References Cited

U.S. PATENT DOCUMENTS

| 3,572,591 | A | * | 3/1971 | Brown .................. 239/337 |
| 4,384,702 | A | * | 5/1983 | Boskovic ................ 249/103 |
| 4,556,096 | A | * | 12/1985 | Nagata et al. ............ 164/79 |
| 4,708,314 | A | * | 11/1987 | Kuhling ................ 249/103 |
| 5,620,716 | A | * | 4/1997 | Opitz ................. 425/169 |
| 5,788,872 | A |   | 8/1998 | Uratani |
| 5,817,349 | A | * | 10/1998 | Pruna ................. 425/542 |
| 5,853,606 | A | * | 12/1998 | Boskovic ............. 249/103 |
| 5,902,512 | A | * | 5/1999 | Streit ................ 249/103 |
| 6,299,126 | B1 | * | 10/2001 | Hughes, II ............ 249/103 |
| 6,308,929 | B1 |   | 10/2001 | Wieder |
| 6,354,560 | B1 | * | 3/2002 | Kawasaki et al. ....... 249/103 |
| 6,554,245 | B2 | * | 4/2003 | Picco et al. .......... 249/103 |
| 6,722,273 | B1 |   | 4/2004 | Pruna |
| 6,755,386 | B2 |   | 6/2004 | Pruna |
| 6,889,954 | B2 |   | 5/2005 | Pruna |

(Continued)

FOREIGN PATENT DOCUMENTS

DE    3509274 C1    9/1986

(Continued)

*Primary Examiner*—Philip C Tucker
*Assistant Examiner*—Dimple N Bodawala
(74) *Attorney, Agent, or Firm*—Curtis L. Harrington; Kathy E. Harrington; Harrington & Harrington

(57) ABSTRACT

A gas-exhausting marking device that is easily attached to the molding device in an appropriate position where the marking device exhibit sufficient gas-exhausting effect. The upper surface and the bottom surface of the marking device according to the present invention are configured to be breathable to allow gas to flow therethrough.

8 Claims, 12 Drawing Sheets

U.S. PATENT DOCUMENTS

| | | | |
|---|---|---|---|
| 6,966,257 B2 | 11/2005 | Uratani | |
| 7,171,894 B2 * | 2/2007 | Uratani | 101/4 |
| 7,252,136 B2 * | 8/2007 | Rieke | 164/229 |
| 2005/0199142 A1 | 9/2005 | Uratani | |

FOREIGN PATENT DOCUMENTS

| | | |
|---|---|---|
| DE | 19928044 | 7/2000 |
| JP | 60159136 A * | 8/1985 |
| JP | 10034671 A * | 2/1998 |
| JP | 2000229325 A * | 8/2000 |
| JP | 2000-323726 | 5/2002 |

* cited by examiner (a)

(b)

(c)

(a)

(b)

Prior Art

REMOVABLE MARKING DEVICE FOR A MOLD

CROSS REFERENCES TO RELATED APPLICATIONS

This is a continuation in part of U.S. patent application Ser. No. 11/211,366 filed on Aug. 24, 2005, now issued U.S. Pat. No. 7,171,894.

This application is based upon and claims the benefit of priority from the prior Japanese Patent Application No. 2006-248731, filed on Sep. 13, 2006, the entire content of which is incorporated herein by reference.

BACKGROUND OF THE INVENTION

1. Field of the Invention

This invention relates to a marking device used in marking the surfaces of products during molding process.

2. Description of the Prior Art

According to the development of plastic molding technique and new resins, various resin materials are used in molding process. Some resin materials used in molding process generate gas during heating process. The gas generated from the resin materials may cause defects of the molded products.

Gas-exhausting apparatuses are generally used to exhaust the gas generating in the molding processes out of a cavity of a molding device. Japan Patent Publication No. 2002-127145 discloses one example of the gas-exhausting apparatuses. FIG. 12 shows the gas-exhausting apparatuses disclosed in the patent publication.

FIG. 12 shows a cavity (C), an upper molding part (U) defining the upper end of the cavity (C), and a molding device including a lower molding part (L) defining the lower end of the cavity (C). A gas-exhausting apparatus (E) is inserted from the bottom end of the through-hole vertically penetrating the lower molding part (L). The molding device (M) further comprises a supporting plate (S) supporting the bottom surface of the gas-exhausting apparatus (E).

The gas-exhausting apparatus (E) is provided on its upper surface with a plurality of gas-exhausting holes. The gas-exhausting holes leads to a gas-exhausting path (P) formed in the gas-exhausting apparatus (E). The gas-exhausting path (P) communicates with the space formed between the outer peripheral surface of the gas-exhausting apparatus (E) and the inner wall defining the through-hole extending through the lower molding part (L). The gas-exhausting path (P) also communicates with the space formed between the lower molding part (L) and the supporting plate (S). Through such structure, the gas generating in the cavity (C) is exhausted.

The gas-exhausting apparatus (E) disclosed in the above-mentioned Japan Patent Publication No. 2002-127145 further includes a cooling structure (F). The cooling structure (F) produces a cooling effect while containing water therein.

The gas-exhausting apparatus (E) has some shortcomings although it advantageously has a cooling function as well as a gas-exhausting function.

For example, the gas-exhausting apparatus cannot sufficiently exhaust gas from a certain shape of cavity. If the products to be molded have a complicated shape, in particular, in their edges, gas tends to accumulate in the corner of the cavity that defines the edge of the molded products. Since the gas-exhausting apparatus (E) disclosed in the above-mentioned patent publication is comparatively bulky and needs to be supported on its bottom surface by the supporting plate, it is difficult to position the gas-exhausting apparatus in the corner of the cavity with a complicated shape.

Also, most molded products are marked with their manufacturing date, lot numbers, manufacturing line numbers, and the like. Such markings are useful in distribution management and quality management of the molded products but they spoil smoothness of the product surface.

When the gas-exhausting apparatus (E) is used in producing molded products with markings for distribution management and quality management, a marking device, in addition to the gas-exhausting apparatus (E), needs to be positioned to face the cavity (C). Accordingly, irregularity is caused on the surface of the molded products by the marking device as well as by the upper surface of the gas-exhausting apparatus (E). Such irregularity is not preferable in terms of the outer appearance of the products.

In order to minimize the irregularity on the product surface, the gas-exhausting apparatus (E) and the marking device must be carefully attached to the molding device, which requires a lot of labor in setting up the molding device for manufacturing molded products.

SUMMARY OF THE INVENTION

Considering the problems described above, one object of the present invention is to provide a gas-exhausting marking device that is easily attached to the molding device in an appropriate position where the marking device exhibits sufficient gas-exhausting effect.

According to the present invention, there is provided a removable marking device for a mold comprising: a substantially cylindrical fixed tube having relief characters on its upper surface, and the fixed tube adapted to be fixed to the mold; a substantially cylindrical rotatable tube having relief characters on its upper surface, and the rotatable tube rotatably inserted into the fixed tube; an indicator axle rotatably inserted into the rotatable tube; a control mechanism that allows only the indicator axle to rotate when the indicator axle rotates in one direction and that allows the indicator axle to rotate with the rotatable tube when the indicator axle rotates in the other direction; wherein the fixed tube is made of porous metallic material having interlinked pores so that gas flows downwardly through the fixed tube.

In another embodiment of the present invention, the control mechanism comprises: a control space formed inside the rotatable tube;

a fixing portion inserted in the indicator axle to radially move in and out of the indicator axle; wherein the control space comprises: a cylindrical space that is concentric with the axis of the rotatable tube; and a projecting space protruding radially from the cylindrical space, and the projecting space having a pair of sides extending from the cylindrical space; wherein an imaginary line is defined between two points from which the pair of sides extending from the cylindrical space; and wherein the angle between one of the pair of sides and the line is different from the angle between the other of the pair of sides and the line.

In another embodiment of the present invention, the removable marking device for a mold further comprises a disk-shaped base member disposed in the bottom of the rotatable tube; a concave portion disposed on the bottom surface of the rotatable tube and in a position corresponding to the relief characters on the upper surface of the fixed tube; and wherein the base member has convex portions that can move in and out of the base member and that can be inserted in the concave portion.

In another embodiment of the present invention, the removable marking device for a mold further comprises a disk-shaped base member in the bottom of the rotatable tube, wherein the base member has a concave portion; wherein the bottom surface of the rotatable tube has convex portions that move in and out of the bottom surface of the rotatable tube and that is disposed in the position corresponding to the relief characters on the upper surface of the fixed tube; and wherein the convex portion can be inserted in the concave portion.

In another embodiment of the present invention, the removable marking device for a mold further comprises a fixing pin, wherein the fixing pin is inserted into a hole formed in a surrounding wall of the fixed tube and into a hole formed on the surrounding surface of the base member.

In another embodiment of the present invention, the removable marking device for a mold further comprises a cover member that closes the bottom opening of the fixed tube.

In another embodiment of the present invention, the upper surface of the indicator axle has a concave portion in which the tip of a tool can be inserted.

According to the present invention, there is further provided a removable marking device for a mold comprising: a substantially cylindrical fixed tube having relief characters on its upper surface, and the fixed tube adapted to be fixed to the mold; a substantially cylindrical rotatable tube having relief characters on its upper surface, and the rotatable tube rotatably inserted into the fixed tube; an indicator axle inserted into the rotatable tube; a control mechanism that allows only the indicator axle to rotate when the indicator axle rotates in one direction and that allows the indicator axle to rotate with the rotatable tube when the indicator axle rotates in the other direction; wherein the control mechanism comprises: a control space formed inside the rotatable tube; and a fixing portion that moves in and out radially and that is inserted in the indicator axle; wherein the control space comprises: a cylindrical space that is concentric with the axis of the rotatable tube; and a projecting space protruding radially from the cylindrical space, and the projecting space having a pair of sides extending from the cylindrical space; wherein an imaginary line is defined between two points from which the pair of sides extending from the cylindrical space; wherein the angle between one of the pair of sides and the line is different from the angle between the other of the pair of sides and the line; and wherein the indicator axle is made of porous metallic material having interlinked pores so that gas flows in the upper surface of the indicator axle through the inside of the indicator axle to the projecting space and exits from the bottom surface of the marking device.

According to the present invention, there is further provided a removable marking device for a mold comprising: a substantially cylindrical fixed tube having relief characters on its upper surface, and the fixed tube adapted to be fixed to the mold; a substantially cylindrical rotatable tube having relief characters on its upper surface, and the rotatable tube rotatably inserted into the fixed tube; an indicator axle inserted into the rotatable tube; a control mechanism that allows only the indicator axle to rotate when the indicator axle rotates in one direction and that allows the indicator axle to rotate with the rotatable tube when the indicator axle rotates in the other direction; wherein the control mechanism comprises: a control space formed inside the rotatable tube; and a fixing portion that moves in and out radially and that is inserted in the indicator axle; wherein the control space comprises: a cylindrical space that is concentric with the axis of the rotatable tube; and a projecting space protruding radially from the cylindrical space, and the projecting space having a pair of sides extending from the cylindrical space; wherein an imaginary line is defined between two points from which the pair of sides extending from the cylindrical space; wherein the angle between one of the pair of sides and the line is different from the angle between the other of the pair of sides and the line; wherein the rotatable tube is made of porous metallic material having interlinked pores so that gas flows in the upper surface of the rotatable tube through the inside of the rotatable tube to the projecting space and exits from the bottom surface of the marking device.

In another embodiment of the present invention, the removable marking device for a mold described, further comprising a disk-shaped base member disposed in the bottom of the rotatable tube, wherein the base member is made of porous metallic material having interlinked pores so that gas having flowed in the projecting space passes through the base member.

In another embodiment of the present invention, the removable marking device for a mold further comprises a disk-shaped base member disposed in the bottom of the rotatable tube, wherein the base member has a through-hole vertically extending therethrough and communicating with the projecting space.

In another embodiment of the present invention, the removable marking device for a mold further comprises: a disk-shaped base member disposed in the bottom of the rotatable tube; and a cover member that closes the bottom opening of the fixed tube; wherein the base member is made of porous metallic material having interlinked pores so that gas in the projecting space passes through the base member; and wherein the cover member has a through-hole vertically extending therethrough.

In another embodiment of the present invention, the removable marking device for a mold further comprises: a disk-shaped base member disposed in the bottom of the rotatable tube; and a cover member that closes the bottom opening of the fixed tube; wherein the base member is made of porous metallic material having interlinked pores so that gas in the projecting space passes through the base member; and wherein the cover member is made of porous metallic material having interlinked pores so that gas from the base member passes through the cover member.

According to the present invention, there is further provided a removable marking device for a mold comprising: a substantially cylindrical fixed tube having relief characters on its upper surface, and the fixed tube adapted to be fixed to the mold; a substantially cylindrical rotatable tube having relief characters on its upper surface, and the rotatable tube rotatably inserted into the fixed tube; an indicator axle rotatably inserted into the rotatable tube; and a base member housed in the fixed tube to support the bottom surfaces of the rotatable tube and of the indicator axle; wherein the indicator axle includes a lower pillar and an upper pillar, the diameter of the upper pillar being smaller than the lower pillar; wherein the inner space of the rotatable tube includes a cylindrical space configured to receive the lower pillar and a plurality of projecting spaces extending radially from the cylindrical space; wherein the lower pillar has a fixing portion moving in and out of the peripheral wall of the lower pillar; wherein the projecting space has a first side protruding outwardly from the cylindrical space and being parallel to the projecting direction of the fixing portion and a second side protruding from the cylindrical space and being slanted with respect to the first side; wherein, if the indicator axle is rotated in one direction, the fixing portion makes contact with the first side of the projecting space so that the rotatable tube is rotated together with the indicator axle; wherein, if the indicator axle is rotated in the other direction, the fixing portion is guided along the second side of the projecting space into the lower pillar so that the rotatable tube is not rotated together with the indicator axle; wherein the peripheral wall of the upper pillar includes a contacting area making contact with the inner surface of the rotatable tube and a non-contacting area keeping away from the inner surface of the rotatable tube so that a gas flow path is formed between the peripheral wall of the upper pillar and the inner surface of the rotatable tube along the non-contacting area; wherein the base member has a through-hole vertically extending therethrough and communicating with the projecting space; and wherein the inner surface of the rotatable tube is provided at the upper end of the lower space with concave grooves configured to connect the gas flow path to the projecting space.

According to the present invention, there is further provided a removable marking device for a mold comprising: a substantially cylindrical fixed tube having relief characters on its upper surface, and the fixed tube adapted to be fixed to the mold; a substantially cylindrical rotatable tube having relief characters on its upper surface, and the rotatable tube rotatably inserted into the fixed tube; an indicator axle rotatably inserted into the rotatable tube; and a base member housed in the fixed tube to support the bottom surfaces of the rotatable tube and of the indicator axle; wherein the indicator axle includes a lower pillar and an upper pillar, the diameter of the upper pillar being smaller than the lower pillar; wherein the inner space of the rotatable tube includes a cylindrical space configured to receive the lower pillar and a plurality of projecting spaces extending radially from the cylindrical space; wherein the lower pillar has a fixing portion moving in and out of the peripheral wall of the lower pillar; wherein the projecting space has a first side protruding outwardly from the cylindrical space and being parallel to the projecting direction of the fixing portion and a second side protruding from the cylindrical space and being slanted with respect to the first side; wherein, if the indicator axle is rotated in one direction, the fixing portion makes contact with the first side of the projecting space so that the rotatable tube is rotated together with the indicator axle; wherein, if the indicator axle is rotated in the other direction, the fixing portion is guided along the second side of the projecting space into the lower pillar so that the rotatable tube is not rotated together with the indicator axle; wherein the peripheral wall of the upper pillar includes a contacting area making contact with the inner surface of the rotatable tube and a non-contacting area keeping away from the inner surface of the rotatable tube so that a gas flow path is formed between the peripheral wall of the upper pillar and the inner surface of the rotatable tube along the non-contacting area; wherein the inner surface of the rotatable tube is provided at the upper end of the lower space with concave grooves configured to connect the gas flow path to the projecting space; and wherein the base member is made of porous metallic material having interlinked pores so that gas flows in the projecting space and passes through the base member.

In another embodiment of the present invention, the removable marking device for a mold further comprises a cover member that closes the bottom opening of the fixed tube, wherein the cover member has a through-hole extending therethrough and communicating with the through-hole extending through the base member.

In another embodiment of the present invention, the removable marking device for a mold further comprises a cover member that closes the bottom opening of the fixed tube, wherein the cover member is made of porous metallic material having interlinked pores so that gas from the base member passes through the cover member.

According to some embodiments of the present invention, the fixed tube is made of porous metallic material having interlinked pores so that the gas generated in the cavity of the molding device enters the marking device from the upper surface of the fixed tube and exits from the bottom surface of the fixed tube. This eliminates the need for separately attaching a gas-exhausting device and a marking device to the molding device, which reduces labor in setting up the molding device for manufacturing molded products and irregularity on the surface of the molded products.

In addition, the marking device facilitates the adjustment of the relief characters on the upper surface of the device by using a control mechanism that decides whether the indicator axle alone is allowed to rotate or both the indicator axle and the rotatable tube are allowed to rotate depending on the rotating direction of the indicator axle.

According to other embodiments of the present invention, it is possible to position the rotatable tube in given places so as to improve the accuracy of positioning the relief characters on the upper surface of the marking device.

According to other embodiments of the present invention, constant angular position of the base member with respect to the fixed tube is achieved to prevent the positioning error while assembling the marking device.

According to another embodiment of the present invention, it is possible to prevent external substance such as dust from entering the marking device in order to avoid disorder of the control mechanism inside the marking device.

According to another embodiment of the present invention, it is possible to adjust the position of the relief characters easily.

According to yet another embodiment of the present invention, the rotatable tube is made of porous metallic material having interlinked pores so that the gas generated in the cavity of the molding device enters the marking device from the upper surface of the rotatable tube and exits from the bottom surface of the marking device. This eliminates the need for separately attaching a gas-exhausting device and a marking device to the molding device, which reduces labor in setting up the molding device for manufacturing molded products and irregularity on the surface of the molded products.

In addition, the marking device facilitates the adjustment of the relief characters on the upper surface of the device by using a control mechanism that decides whether the indicator axle alone is allowed to rotate or both the indicator axle and the rotatable tube are allowed to rotate depending on the rotating direction of the indicator axle.

According to yet another embodiment of the present invention, the indicator axle is made of porous metallic material having interlinked pores so that the gas generated in the cavity of the molding device enters the marking device from the upper surface of the indicator axle and exits from the bottom surface of the marking device. This eliminates the need for separately attaching a gas-exhausting device and a marking device to the molding device, which reduces labor in setting up the molding device for manufacturing molded products and irregularity on the surface of the molded products.

In addition, the marking device facilitates the adjustment of the relief characters on the upper surface of the device by using a control mechanism that decides whether the indicator axle alone is allowed to rotate or both the indicator axle and the rotatable tube are allowed to rotate depending on the rotating direction of the indicator axle.

According to other embodiments of the present invention, the base member is configured to be breathable so that the gas having flowed into the marking device can be exhausted.

According to other embodiments of the present invention, the base member and the cover member are configured to be breathable so that the gas having flowed into the marking device can be exhausted.

According to other embodiments of the present invention, gas flow paths are formed between the outer peripheral wall of the indicator axle and the inner wall of the rotatable tube. Gas flows into the marking device through the gas flow paths and exits from the bottom surface of the marking device. Accordingly, the marking device itself enables gas-exhausting as well as marking. This eliminates the need for separately attaching a gas-exhausting device and a marking device to the molding device, which reduces labor in setting up the molding device for manufacturing molded products and irregularity on the surface of the molded products.

In addition, the marking device facilitates the adjustment of the relief characters on the upper surface of the device by using a control mechanism that decides whether the indicator axle alone is allowed to rotate or both the indicator axle and the rotatable tube are allowed to rotate depending on the rotating direction of the indicator axle. According to other embodiments of the present invention, the cover member sufficiently prevents external substances from entering the marking device. The cover member is configured to be breathable so as not to interfere with exhausting the gas that has flowed in the marking device.

BRIEF DESCRIPTION OF THE DRAWINGS

Hereinafter, some embodiments of the removable marking device for a mold according to the present invention will be explained with referring to the accompanying drawings.

DETAILED DESCRIPTION OF THE INVENTION

Figure 1:
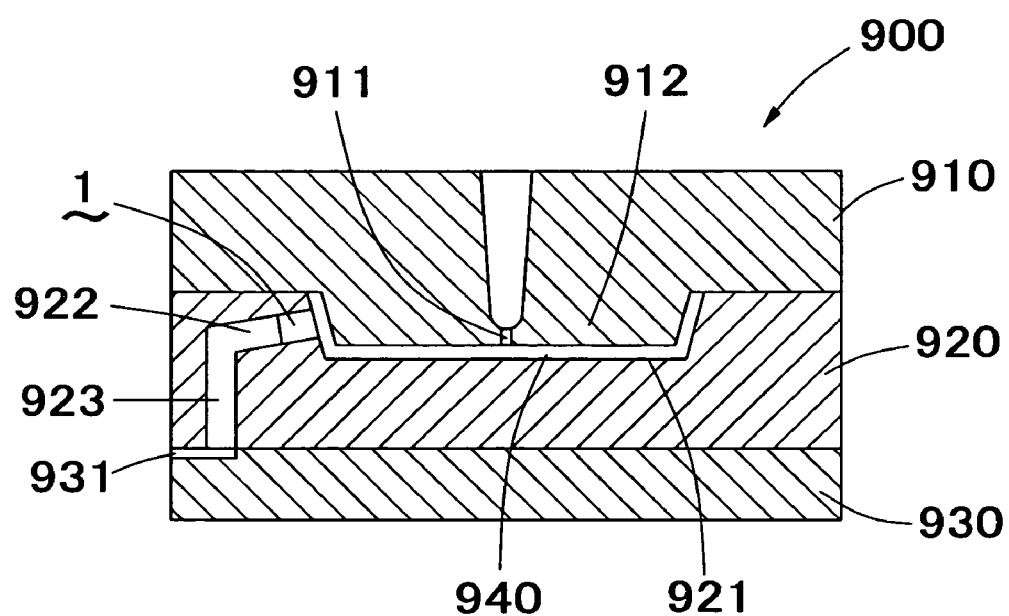
FIG. 1 is a view illustrating one embodiment of the marking device according to the present invention as attached in a molding device.

FIG. 1 shows one example of the removable marking device for a mold according to the present invention.

The molding device (900) has a fixed mold (910), a movable mold (920) engaging with the fixed mold (910), movable plate (930) connected to the movable mold (920) and an actuator (not shown). The movement of the actuator is transmitted via the movable plate (930) to the movable mold (920) so that the movable mold (920) moves toward and moves away from the fixed mold (910).

The fixed mold (910) has an injecting opening (911) for injecting molten resin.

The fixed mold (910) further includes a convex portion (912) extending downwardly around the injecting opening (911). The movable mold (920) has a concave portion (921) receiving the convex portion (912) therein. The convex portion (912) has a smaller volume than the space defined inside the concave portion (921) so that a given shape of a cavity (940) is formed between the convex portion (912) and the concave portion (921). The cavity (940) shown in FIG. 1 is capable of molding cup-shaped products with a flared sidewall.

The movable mold (920) has a first hole (922) and a second hole (923).

The first hole (922) has an opening on the flared sidewall of the cavity (940). The first hole (922) extends in a substantially perpendicular direction away from the flared sidewall to a certain depth of the movable mold (920).

The second hole (923) has an opening on the substantially planar bottom surface of the movable mold (920). The second hole (923) upwardly extends in a substantially perpendicular direction away from the bottom surface and communicates with the bottom end of the first hole (922).

The movable plate (930) is provided on its upper surface with a concave groove (931) leading to the side wall of the movable plate (930). The concave groove (931) communicates with the bottom end of the second hole (923).

The marking device (1) is engaged in the uppermost part of the first hole (922) which is adjacent to the cavity (940). The marking device (1) is fit into the opened molding device (900) (the fixed mold (910) and the movable mold (920) are apart from each other) with a certain instrument.

Figure 2:
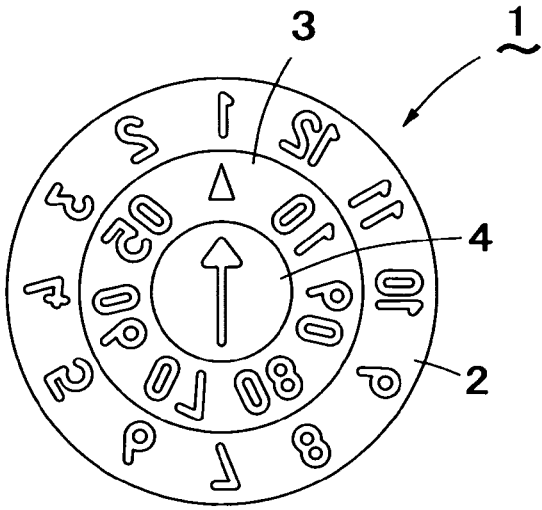
FIG. 2 is a view illustrating one embodiment of the removable marking device for a mold according to the present invention.
Figure 2:
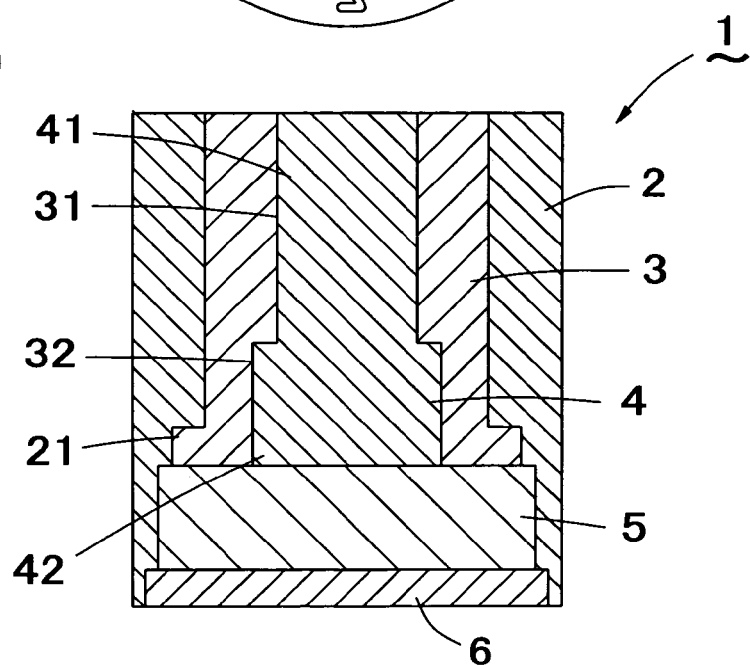
Figure 2:
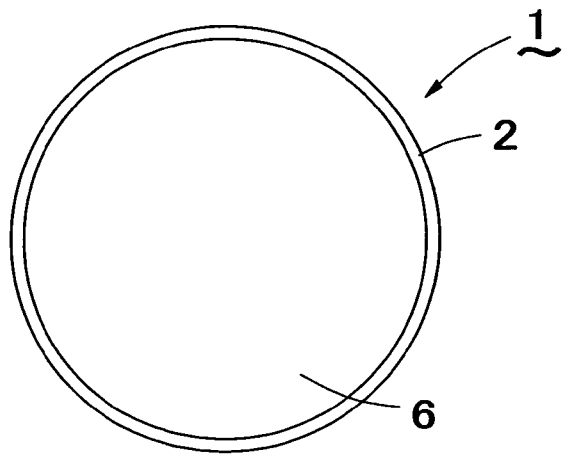

FIG. 2 shows the removable marking device (1) for a mold according to the present invention. FIG. 2(*a*) is a plan view of the marking device (1). FIG. 2(*b*) is a longitudinal sectional view of the marking device to show the main composition. FIG. 2(*c*) shows a bottom view of the marking device (1).

The marking device (1) consists of a substantially cylindrical fixed tube (2) that forms an outer circumferential contour of the marking device (1), and of a substantially cylindrical rotatable tube (3) that can be rotatably inserted into the fixed tube (2), and of an indicator axle (4) that can be rotatably inserted into the rotatable tube (3), and of a base member (5) that is disposed below the rotatable tube (3), and of a disk-shaped cover member (6) that closes a bottom opening of the fixed tube (2).

Once the marking device (1) is mated in the first hole (922) of the molding device (900), the outer surface of the fixed tube (2) keeps a firm contact with the inner wall of the first hole (922). Consequently, while the indicator axle (4) rotates, the fixed tube (2) does not rotate with respect to the molding device (900).

There are some steps on an inner wall of the fixed tube (2) Each step defines a position of the rotatable tube (3), the base member (5), and the cover member (6) so that the fixed tube (2) has internal spaces that widen downwardly step by step. An annular projection portion (21) that radially projects at the lower end of the rotatable tube (3) contacts the step of an inner wall of the fixed tube (2). In addition, the base member (5) and the cover member (6) respectively contact the steps formed at the inner wall of the fixed tube (2). Thus, the top surface of the rotatable tube (3) becomes leveled with that of the fixed tube (2).

As for examples shown in FIG. 2, numeric characters (relief characters) from "1" to "12" are carved on the top surface of the fixed tube (2) in order to indicate the manufacturing month. However, carved characters are not limited to numeric characters, and any characters can be carved.

An inner wall of the rotatable tube (3) has a step to axially position the indicator axle (4). Besides, the inside of the rotatable tube (3) has a lower space (32) and an upper space (31). The lower space (32) is wider than the upper space (31). The lower spaces comprise control spaces as a part of the control mechanism (its details will be described later).

The indicator axle (4) consists of a cylindrical upper pillar (41) forming the upper portion of the indicator axle (4), and of a lower pillar (42) forming the lower portion of the indicator axle (4). The lower pillar (42) is thicker than the upper pillar (41). The upper surface of the lower pillar (42) contacts the step on the inner wall of the rotatable tube (3).

The indicator axle (4) is as long as the rotatable tube (3). As mentioned above, the base member (5) and the cover member (6) respectively contact the steps on the inner wall of the fixed tube (2), and the top surface of the indicator axle (4) becomes leveled with that of the rotatable tube (3).

On the top surface of the rotatable tube (3), numeric characters (relief characters) from "05" to "10" are carved in order to indicate the manufacturing year, as well as a triangular mark is carved so as to point out particular numbers of the upper surface of the fixed tube (2).

A marking arrow is carved on the upper surface of the indicator axle (4). The configuration of the marking arrow corresponds to a tip of a slotted screwdriver, which can be inserted into the marking arrow.

The rotatable tube (3) rotates with respect to the fixed tube (2), whereas the indicator axle (4) rotates with respect to the rotatable tube (3). For example, when the triangular mark of the rotatable tube (3) points out the numeric character "1", and the marking arrow of the indicator axle (4) points out the numeric character "5", date of manufacturing can be marked on a mold product, representing January of the year 2005.

In spite of a rotary action of the rotatable tube (3) or the indicator axle (4), the base member (5) does not rotate. In addition, the cover member (6) seals the lower opening of the fixed tube (2), which prevents dust from breaking in the marking device (1).

Figure 3:
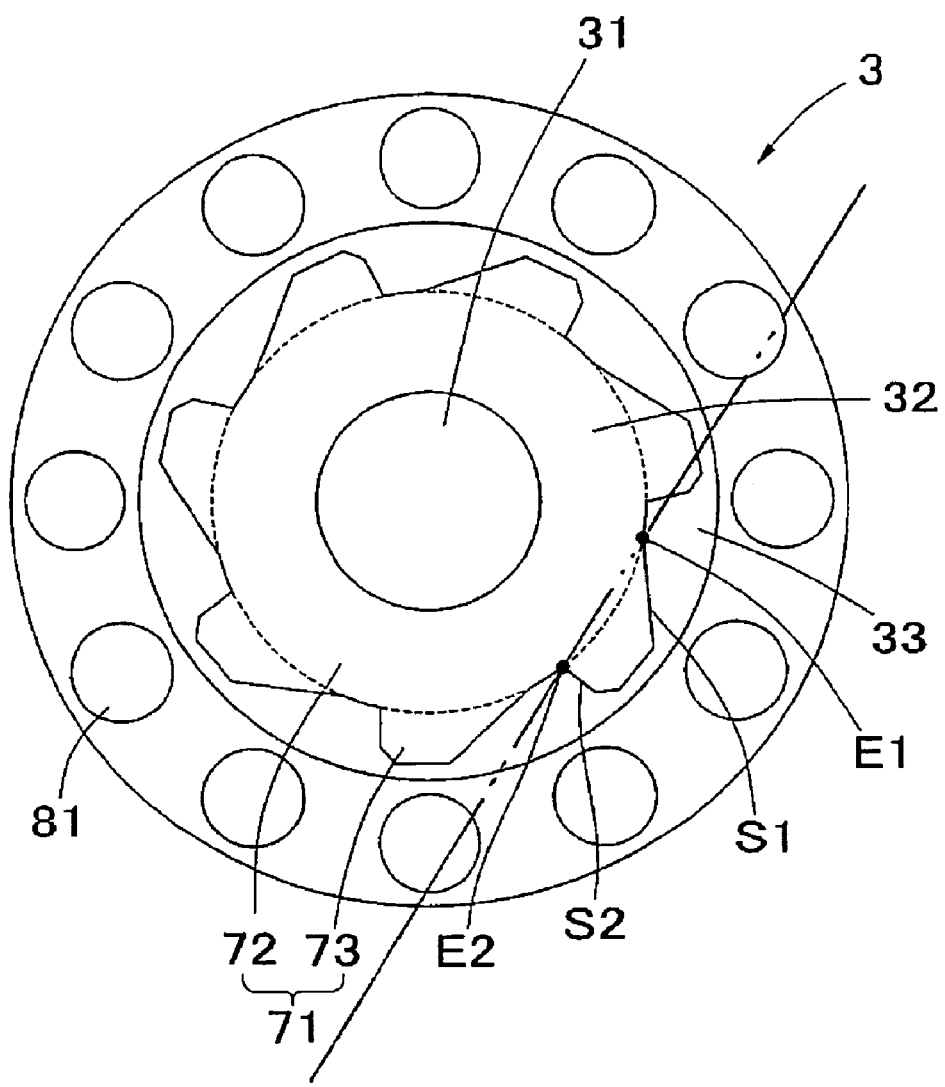
FIG. 3 is a view illustrating one embodiment of the base structure of the rotatable tube of the removable marking device for a mold according to the present invention.

FIG. 3 is a bottom view of the rotatable tube (3), and describes the base structure of the rotatable tube (3) in detail.

A ring (33) for controlling rotary motion is fixed on the lower space (32) of the rotatable tube (3). The ring (33) has specific thickness. The inner space of the ring (33) is defined as a control space (71).

The control space (71) consists of a cylindrical space (72) defined as an inscribed circle of an inner wall of the ring (33) (i.e. a circle with the dotted line described in FIG. 3), and of a projecting space (73) that radially projects from the cylindrical space (72).

As shown in FIG. 3, the number of the projecting space (73) equals to the total number of marks or numeric characters carved on the top surface of the rotatable tube (3). The disposition of the projecting space (73) corresponds to that of these numeric characters or marks.

Thus, according to examples in FIG. 2, numeric characters from "05" to "10" and a triangular mark, six symbols of numeric characters and one mark, are carved on the top surface of the rotatable tube (3). Hence, these numeric characters and mark are disposed at even intervals in a circumferential direction. There are the same numbers of the projecting spaces (73) as the total characters on the top surface of the rotatable tube (3), and the projecting spaces (73) are distributed in accordance with the disposition of the characters. Thus, seven projecting spaces (73) are formed at even intervals in a circumferential direction.

The projecting space (73) shown in FIG. 3 has a trapezoidal cross section, which is not limited to a shape of FIG. 3. Thus, any shape can be used if the following conditions are achieved.

Referring to a pair of sides (S1, S2) extending from the cylindrical space (72), end points of S1 and S2 close to the cylindrical space (72) are defined as E1 and E2 respectively. As long as an angle of the side S1 with respect to a line connecting points E1 and E2 differs an angle of the side S2 with respect to the line connecting points E1 and E2, the configuration of the projecting space (73) can be arbitrary.

Furthermore, one angle is preferably an acute angle, while the other angle is preferably an obtuse angle or a right angle.

In the example shown, the side S2 is parallel to the projecting direction of the fixing portion (described below). The side S1 is moderately slanted with respect to the side S2 so that the distance between the sides S1 and S2 is shortened as it gets nearer to the outer wall of the rotatable tube (3).

Moreover, the bottom surface of the rotatable tube (3) has a concave portion (81). The concave portion (81) is disposed at the location which corresponds to characters, numeric characters, and marks carved on the top surface of the fixed tube (2). Hence, as for examples shown in FIG. 2, numeric characters from "1" to "12" are formed at even intervals in a circumferential direction. Therefore, at the bottom surface of the rotatable tube (3), twelve concaves (81) are engaged at even intervals in a circumferential direction.

Figure 4:
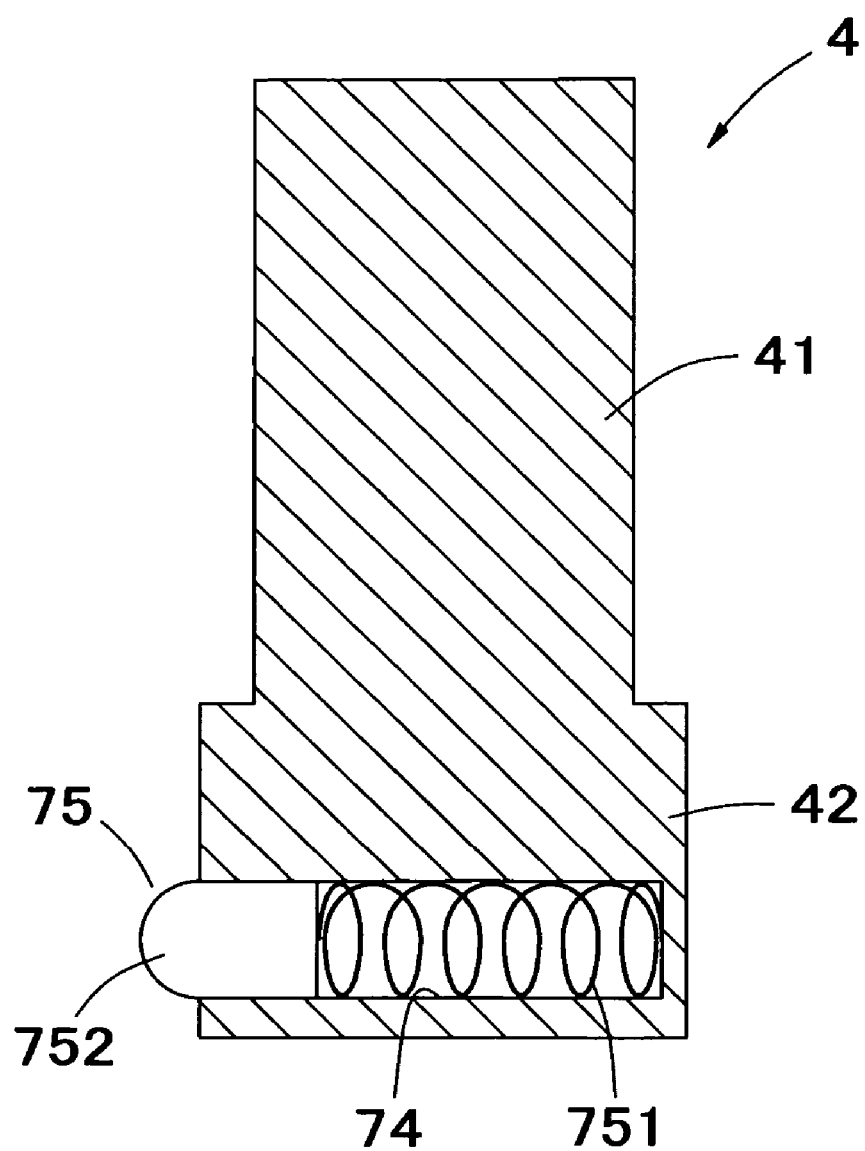
FIG. 4 is a longitudinal sectional view illustrating one embodiment of the indicator axle of the removable marking device for a mold according to the present invention.

FIG. 4 is a cross section of the indicator axle (4), and describes the inside of the indicator axle (4) in detail. On the lower pillar (42) of the indicator axle (4), a hole (74) is formed along the diameter of the lower pillar (42). Besides, a fixing portion (75) is buried in the hole (74).

The fixing portion (75) consists of a coil spring (751) and a tip (752) attached to the end of the coil spring (751). The tip (752) partially projects from the circumferential surface of the lower pillar (42). When the coil spring (751) is compressed, this projecting portion can be completely accommodated within the hole (74). In addition, the tip (752) is hemispherical-shaped.

Figure 5:
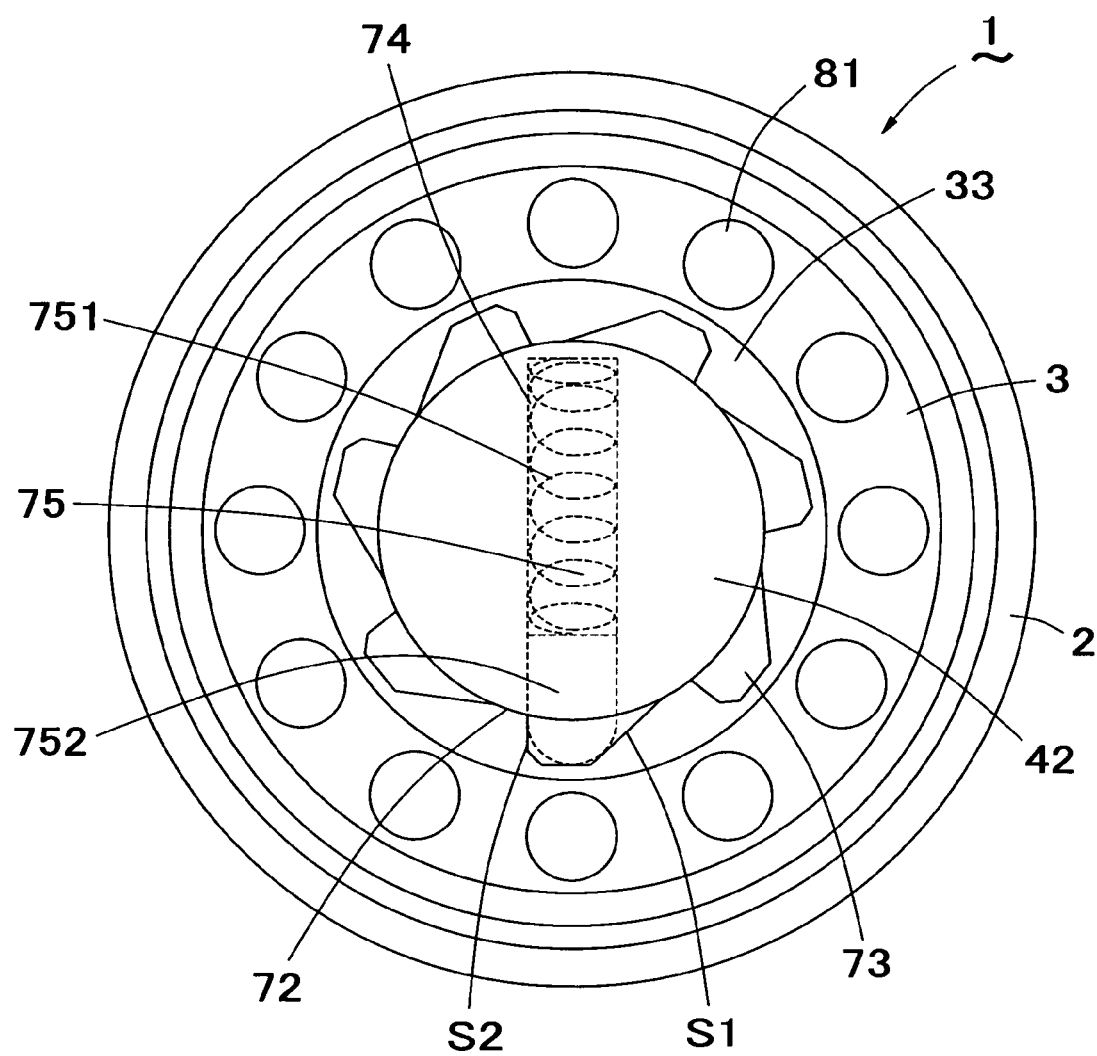
FIG. 5 is a view illustrating one embodiment of the control mechanism of the removable marking device for a mold according to the present invention.

FIG. 5 is a bottom view of the marking device (1), and represents a condition without the cover member (6) and the base member (5).

A control mechanism comprises of the above-mentioned fixing portion (75) and control space (71).

The lower pillar (42) of the indicator axle (4) is inserted into the cylindrical space (72) surrounded by the dotted line shown in FIG. 4. The circumferential outline of the lower pillar (42) corresponds to the dotted line shown in FIG. 4.

Furthermore, the tip (752) of the fixing portion (75) buried in the lower pillar (42) projects to the projecting space (73).

Under such circumstances, the indicator axle (4) rotates towards the side S1 of the projecting space (73) having a moderate slope (i.e. the indicator axle (4) rotates counter-clockwise). At this time, the tip (752) of the fixing portion (75) is guided along the side S1 and is moved into the hole (74) formed by the lower pillar (42) with compressing the coil spring (751). When the tip (752) of the fixing portion (75) reaches to the adjacent projecting space (73), it once again projects from the lower pillar (42), which stops the rotary action of the indicator axle (4), and the indicator axle (4) is in position.

On the contrary, the indicator axle (4) rotates towards the side S2 of the projecting space (73) having a steep slope (i.e. the indicator axle (4) rotates clockwise). At this time, the tip (752) of the fixing portion (75) is caught on the side S2, which rotates the rotatable tube (3) with the indicator axle (4). Thus, the control mechanism allows the indicator axle (4) to rotate, or both the indicator axle (4) and the rotatable tube (3) to rotate by choice of rotary direction.

Figure 6:
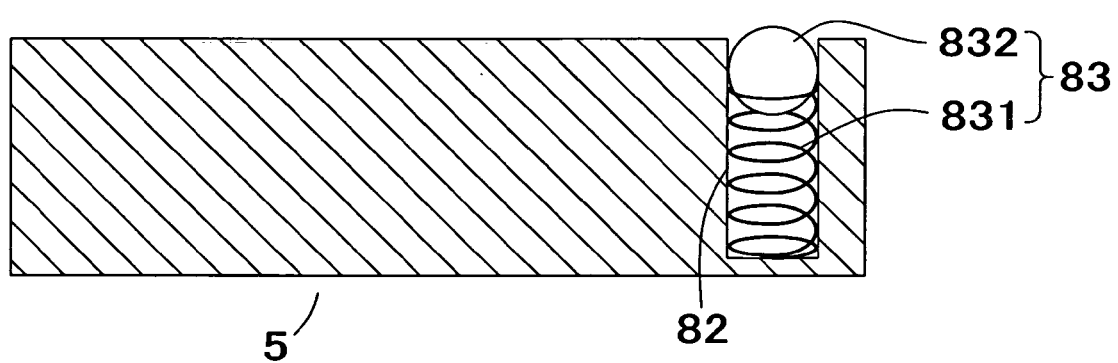
FIG. 6 is a view illustrating one embodiment of the base member of the removable marking device for a mold according to the present invention.

FIG. 6 is a detailed cross sectional view of the base member (5). The base member (5) comprises a hole (82) on the top surface of the base member (5). A convex portion (83) is buried in a hole (82). The convex portion (83) consists of a coil spring (831) and a spherical tip (832) attached to the top end of the coil spring (831). A portion of the tip (832) can be projected from the top surface of the base member (5), as well as it can be moved inside the hole (82) by the coil spring's (831) compression.

The tip of the convex portion (83) is inserted into the concave portion (81) formed on the bottom surface of the rotatable tube (3) shown in FIG. 3 and FIG. 5, which positions the rotatable tube (3) at specific angular places.

Furthermore, it is preferable to form a hole through the wall of the fixed tube (2), and a hole on the circumferential surface of the base member (5), so that a pin can be inserted into both holes.

Hence, the convex portion (83) of the base member (5) can be at the constant positional relationship with characters, numeric characters, and marks, which rids positioning errors resulting from assembling.

Furthermore, even though the structure of the convex portion (83) shown in FIG. 6 is employed instead of the concave portion (81) of the rotatable tube (3) and the concave portion (81) of the rotatable tube (3) shown in FIG. 3 and FIG. 5 is employed instead of the convex portion (83) of the base member (5), it is feasible to gain the same results in the above-mentioned structure.

Figure 7:
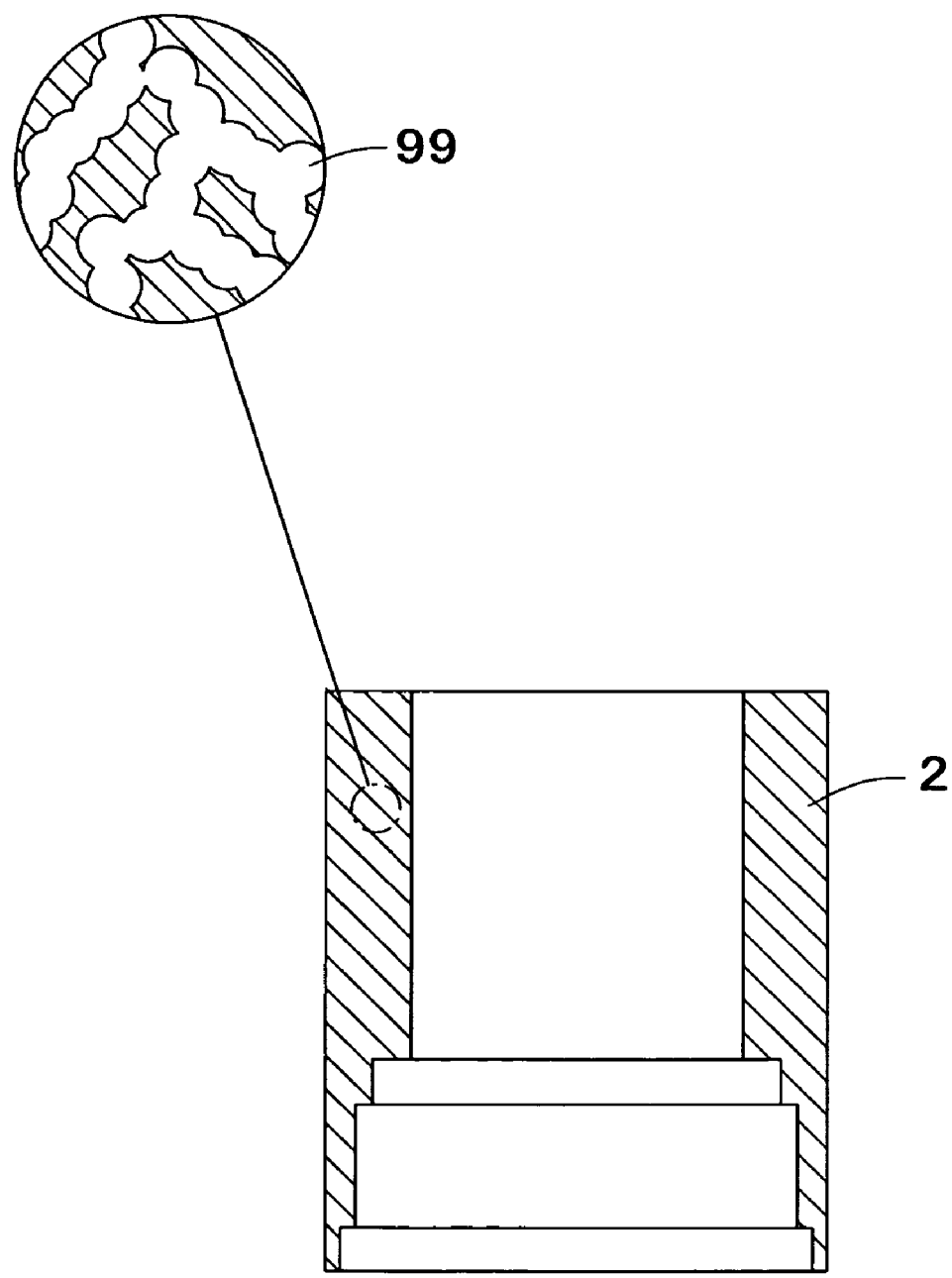
FIG. 7 is a view illustrating one embodiment of the fixed tube of the removable marking device for a mold according to the present invention. The fixed tube is made of porous metallic material having interlinked pores.

FIG. 7 includes a cross sectional view of the fixed tube (2) and a microscopic view illustrating the material constituting the fixed tube (2).

The fixed tube (2) is made of porous metallic material. The metallic material includes many pores therein. One pore is linked to other adjacent pores. Accordingly, a substantial number of flow channels (99) are formed inside the fixed tube (2).

The manufacturing method of such porous metallic material having interlinked pores is disclosed in Japan Patent Publication S60-159136, the entire content of which is incorporated herein by reference.

Figure 8:
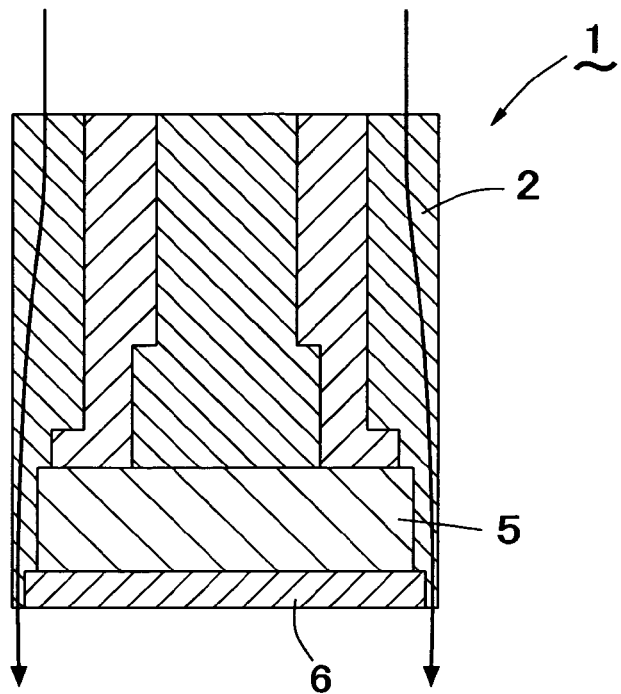
FIG. 8 is a view illustrating the gas flow path in one embodiment of the removable marking device for a mold according to the present invention.
Figure 8:
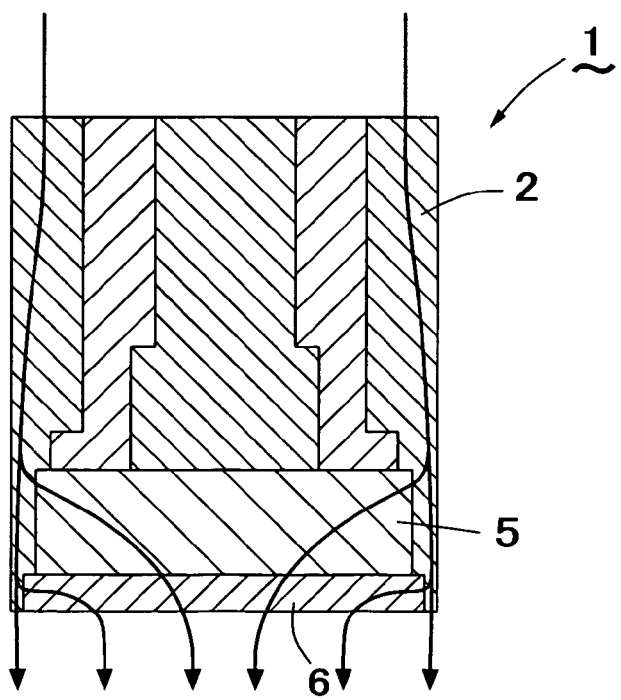

FIG. 8 shows a gas flow path through the marking device (1) in some embodiments of the present invention. FIG. 8a shows the gas flow path in an embodiment where the fixed tube (2) is made of the porous metallic material having interlinked pores. FIG. 8b shows the gas flow path in an embodiment where the fixed tube (2), the base member (5) and the cover member (6) are made of the porous metallic material.

As shown in FIG. 1, the upper surface of the marking device (1) is fit into the opening end of the first hole (922). Therefore, the gas generated from molten resin during molding processes contacts with the upper surface of the marking device (1).

As described above, the fixed tube (2) made of the porous metallic material has a significant number of flow channels (99) therein. The gas pressurized during the molding process flows into the fixed tube (2) through the flow channels having openings on the upper surface of the fixed tube (2). Then the gas flows through the flow channels (99) and exits from the flow channels (99) having openings on the bottom surface of the fixed tube (2).

As shown in FIG. 8b, in the embodiment where the fixed tube (2), the base member (5), and the cover member (6) are made of the porous metallic material having interlinked pores so that the gas having flowed in the fixed tube (2) passes through the base member (5) and the cover member (6) through the flow channels (99) formed therein. The gas passes the flow path indicated by an arrow in FIG. 8b. It is possible for the gas to exit from the whole area of the bottom surface of the marking device (1).

Figure 9:
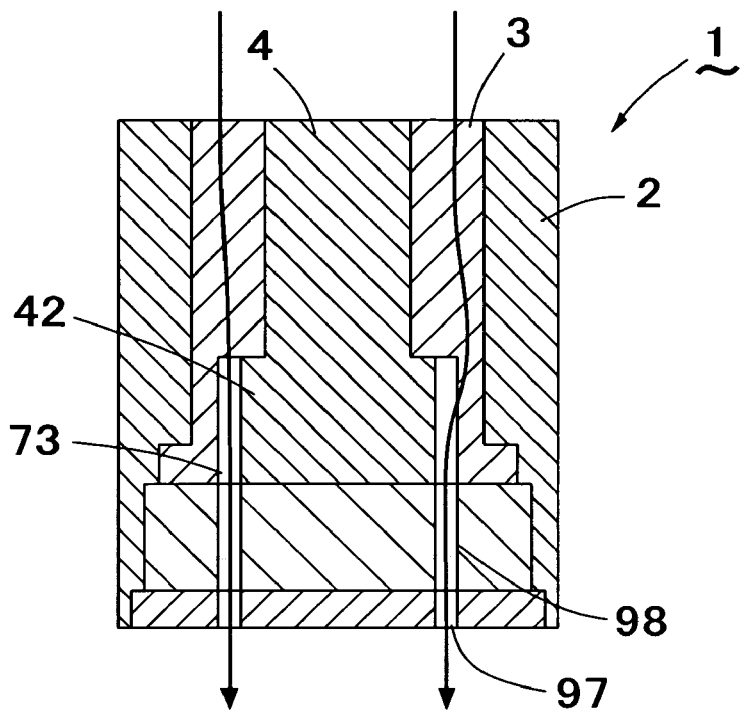
FIG. 9 is a view illustrating the gas flow path in another embodiment of the removable marking device for a mold according to the present invention.
Figure 9:
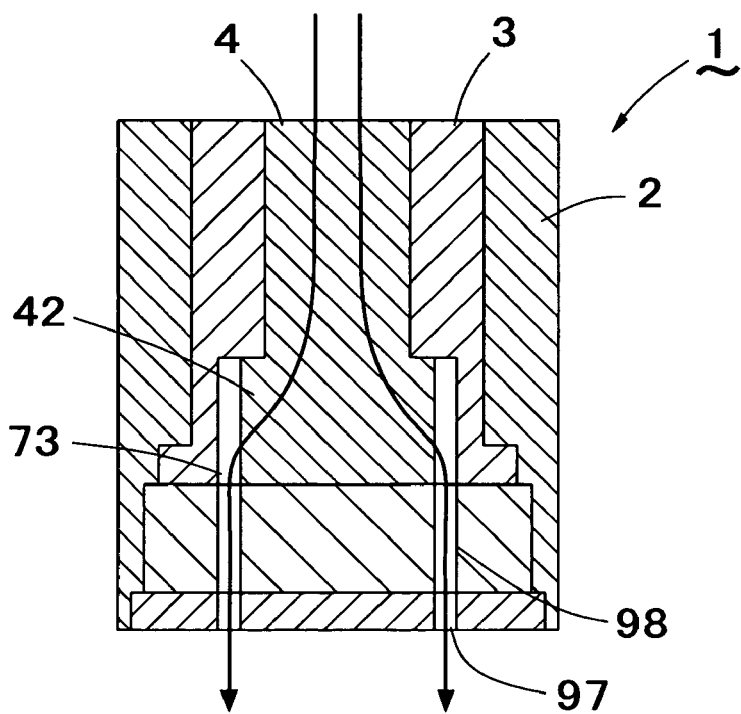

FIG. 9 shows a gas flow path through the marking device (1) in other embodiments of the present invention. FIG. 9a shows the gas flow path in an embodiment where the rotatable tube (3) is made of the porous metallic material having interlinked pores. FIG. 9b shows the gas flow path in an embodiment where the indicator axle (4) is made of the porous metallic material having interlinked pores.

FIG. 9a and FIG. 9b generally illustrates the projecting space (73) (See FIG. 5) formed between the circumferential surface of the lower pillar (42) and the inner wall of the rotatable tube (3). In FIG. 9, the base member (5) has a through-hole (98) vertically extending therethrough and communicating with the projecting space (73). The cover member (6) also has a through-hole (97) vertically extending therethrough and communicating with the through hole formed in the base member (5).

In the embodiment shown in FIG. 9a, the rotatable tube (3) is made of the porous metallic material having interlinked pores so as to include many flow channels (99) therein. The gas pressurized during the molding process flows into the rotatable tube (3) through the flow channels (99) having openings on the upper surface of the rotatable tube (3). The gas then flows through the flow channels (99) into the projecting space (73).

Finally, the gas passes through the through-holes (97) and (98) and exits from the bottom surface of the marking device (1).

In the embodiment shown in FIG. 9b, the indicator axle (4) is made of the porous metallic material having interlinked pores so as to include many flow channels (99) therein. The gas pressurized during the molding process flows into the indicator axle (4) through the flow channels (99) having openings on the upper surface of the indicator axle (4). The gas then flows through the flow channels (99) into the projecting space (73).

In the embodiments shown in FIG. 9, the base member (5) and the cover member (6) may be made of the porous metallic material having interlinked pores. In this case, the gas that has flowed into the projecting space (73) passes through a significant number of the flow channels (99) formed in the base member (5) and in the cover member (6) to exit from the bottom surface of the marking device (1).

The gas flow paths through the marking device (1) are not limited to those mentioned above but those of ordinary skill in the art should appreciate that many changes and modifications can be made within the scope and the spirit of the present invention. For example, various flow paths may be formed by using the porous metallic material for forming at least one of the members selected from a group consisting of the indicator axle (4), the rotatable tube (3), and the fixed tube (2) in addition to configuring the base member (5) and the cover member (6) to allow for gas to pass therethrough.

Figure 10:
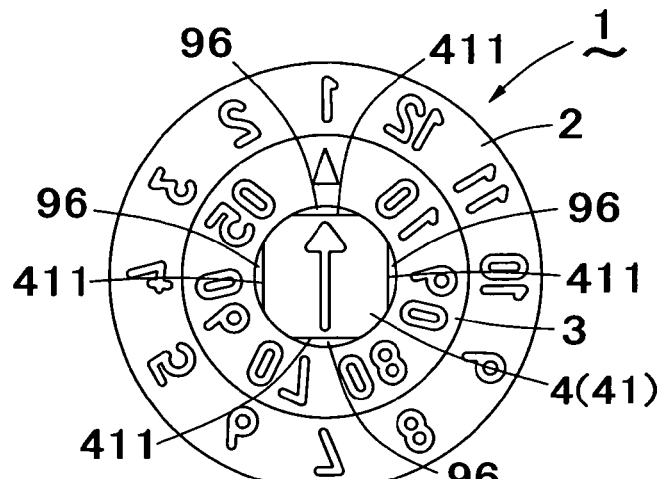
FIG. 10 is a view illustrating another embodiment of the removable marking device for a mold according to the present invention.
Figure 10:
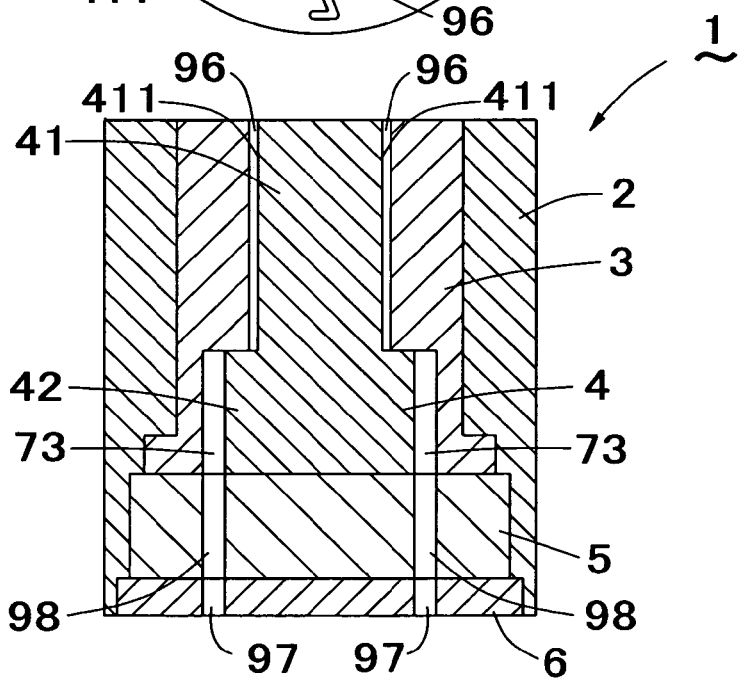
Figure 10:
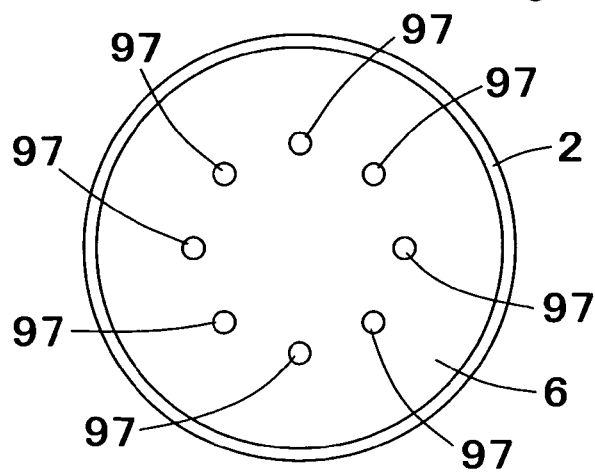

FIG. 10 shows another embodiment of the marking device (1). FIG. 10a is an upper view of the marking device (1); FIG. 10b is a longitudinal cross section view illustrating the main configuration of the marking device (1); and FIG. 10c is a bottom view of the marking device (1).

The marking device (1) shown in FIG. 10 has similar configurations to the marking device (1) shown in FIG. 1 to FIG. 9. Only the indicator axle (4) and the rotatable tube (3) have slightly different structures from the previously discussed embodiments.

The indicator axle (4) in the embodiment shown in FIG. 10 includes a cylindrical lower pillar (42) and an upper pillar (41) extending upwardly from the upper surface of the lower pillar (42). The upper pillar (41) is thinner than the lower pillar (42).

The cross section of the upper pillar (41) is not perfectly circular but a part of its sidewall is flattened. In the embodiment shown in FIG. 10, the sidewall of the upper pillar (41) has four flat surfaces (411).

In the marking device (1) as assembled, flow paths (96) are formed between the flat surfaces (411) and the inner wall of the rotatable tube (3). The cross-section area of the flow paths (96) formed between the flat surfaces (411) and the inner wall of the rotatable tube (3) is defined so that the distance from the centerline of the flat surfaces (411) to the inner wall of the rotatable tube (3) is 0.015 mm or less. Such cross-section area of the flow paths (96) prevents molten resin from flowing into the marking device (1). The cross-section dimension of the flow paths (96) may be defined according to the viscosity and the surface tension of the resin used in the present invention, but not limited to the above-mentioned dimension.

Figure 11:
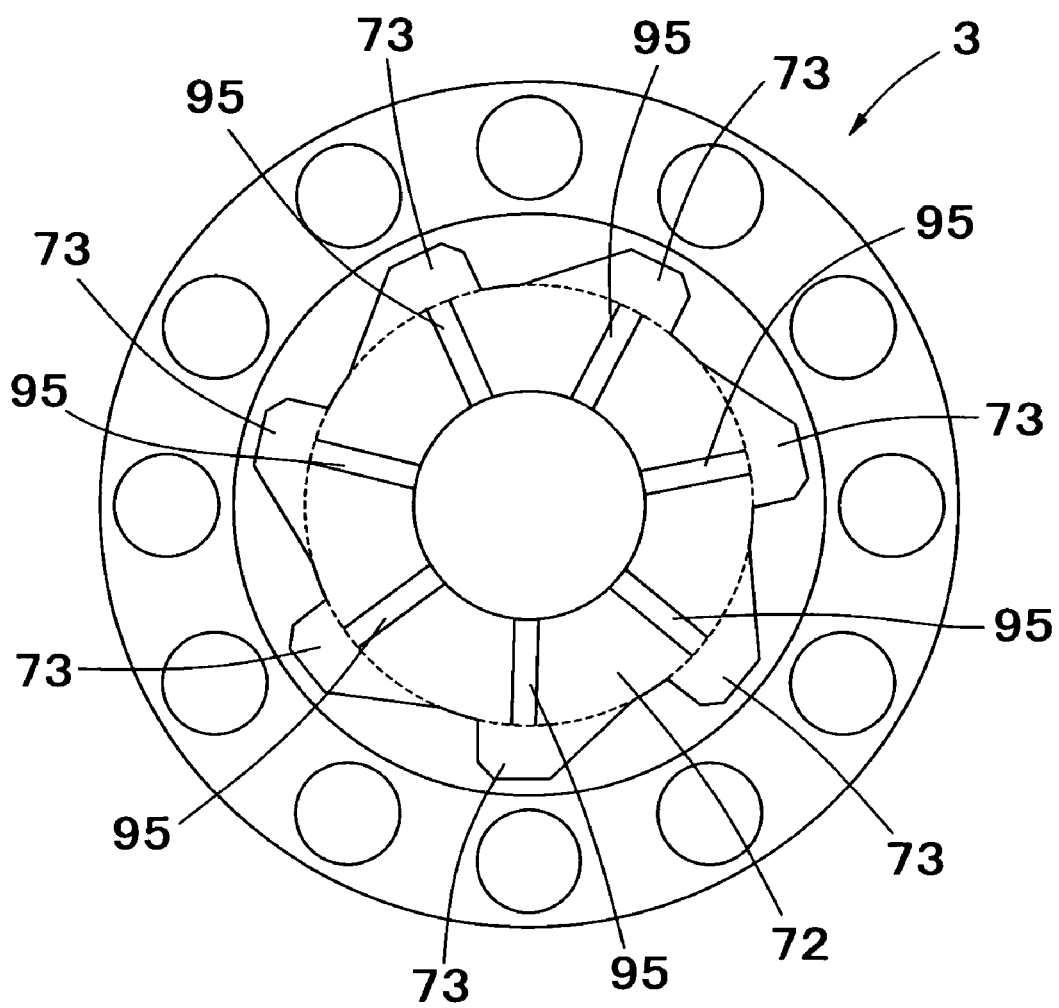
FIG. 11 is a bottom view of the rotatable tube of the removable marking device for a mold shown in FIG. 10.
Figure 12:
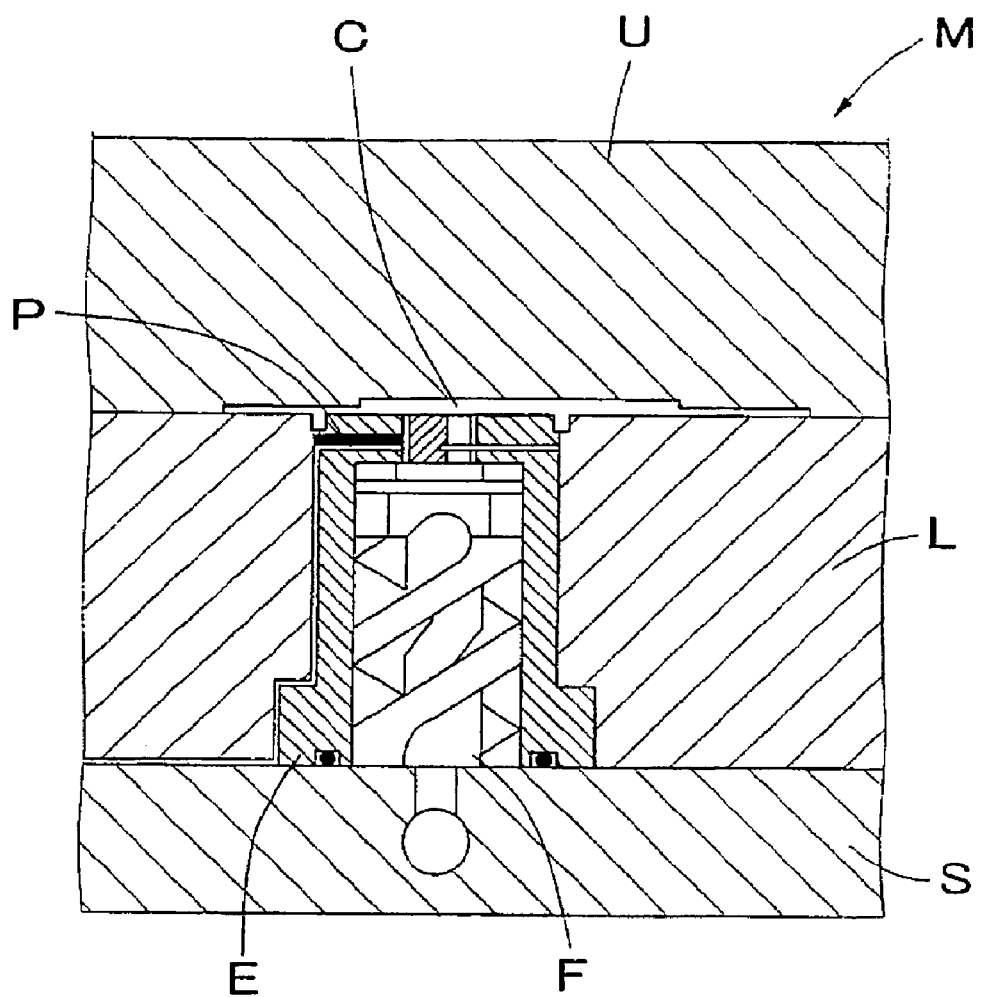
FIG. 12 is a view illustrating a conventional device for exhausting gas from a cavity of a molding device.

FIG. 11 is a bottom view of the rotatable tube (3).

The inner surface of the rotatable tube (3) is provided at the upper end of the lower space (72) with a plurality of grooves (95) configured to connect the gas flow path to the projecting space (73). The grooves (95) extend radially to the projecting spaces (73), respectively.

In the marking device (1) as assembled, some of the grooves (95) connect to the flow paths (96) formed between the upper pillar (41) and the inner wall of the rotatable tube (3).

Now referring again to FIG. 10, the base member (5) in this embodiment has a through-hole extending therethrough and communicating with the projecting spaces (73) as in the embodiment shown in FIG. 9. The cover member (6) has a through-hole extending therethrough and communicating with the through hole formed in the base member (5).

In the embodiments described referring to FIG. 10 and FIG. 11, the gas generating in the cavity (940) is compressed there so that, when the gas passes on the upper surface of the marking device (1), the gas flows into the flow paths (96). Flowing down the flow paths (96), the gas reaches the grooves (95) formed in the inner wall of the rotatable tube (3) which leads the gas to the projecting spaces (73). After flowing in the projecting spaces (73), the gas passes through the through-holes (97, 98) extending through the base member (5) and the cover member (6) and then exits from the bottom surface of the marking device (1).

Needles to say, the marking device (1) in the embodiments shown in FIG. 10 and FIG. 11 may have the base member (5) or the cover member (6) made of the porous metallic material having interlinked pores.

While several embodiments of the present invention have been shown and described, it is to be understood that many changes and modifications may be made thereunto without departing from the spirit and scope of the invention as defined in the appended claims.

What is claimed is:

1. A removable marking device for a mold comprising:
a substantially cylindrical fixed tube having relief characters on its upper surface, and said fixed tube adapted to be fixed to said mold;
a substantially cylindrical rotatable tube having relief characters on its upper surface, and the rotatable tube rotatably inserted into said fixed tube;
an indicator axle inserted into said rotatable tube;
a control mechanism that allows only said indicator axle to rotate when said indicator axle rotates in one direction and that allows said indicator axle to rotate with said rotatable tube when said indicator axle rotates in the other direction;
a disk-shaped base member disposed in a bottom of said rotatable tube,
wherein said control mechanism comprises:
a control space formed inside said rotatable tube; and
a fixing portion that moves in and out radially and that is inserted in said indicator axle;
wherein said control space comprises:
a cylindrical space that is concentric with an axis of said rotatable tube; and
a projecting space protruding radially from said cylindrical space, and said projecting space having a pair of sides extending from said cylindrical space;
wherein an imaginary line is defined between two points from which said pair of sides extending from said cylindrical space;
wherein the angle between one of said pair of sides and said line is different from the angle between the other of said pair of sides and said line;
wherein said indicator axle is made of porous metallic material having interlinked pores so that gas flows in an upper surface of said indicator axle through the inside of said indicator axle to said projecting space and exits from a bottom surface of said marking device; and
wherein said base member has a through-hole vertically extending therethrough and communicating with said projecting space.

2. A removable marking device for a mold comprising:
a substantially cylindrical fixed tube having relief characters on its upper surface, and said fixed tube adapted to be fixed to said mold;
a substantially cylindrical rotatable tube having relief characters on its upper surface, and the rotatable tube rotatably inserted into said fixed tube;
an indicator axle inserted into said rotatable tube;
a control mechanism that allows only said indicator axle to rotate when said indicator axle rotates in one direction and that allows said indicator axle to rotate with said rotatable tube when said indicator axle rotates in the other direction;
a disk-shaped base member disposed in a bottom of said rotatable tube; and a cover member that closes a bottom opening of said fixed tube;
wherein said control mechanism comprises:
a control space formed inside said rotatable tube; and
a fixing portion that moves in and out radially and that is inserted in said indicator axle;
wherein said control space comprises:
a cylindrical space that is concentric with an axis of said rotatable tube; and
a projecting space protruding radially from said cylindrical space, and said projecting space having a pair of sides extending from said cylindrical space;
wherein an imaginary line is defined between two points from which said pair of sides extending from said cylindrical space;
wherein the angle between one of said pair of sides and said line is different from the angle between the other of said pair of sides and said line; and
wherein said indicator axle is made of porous metallic material having interlinked pores so that gas flows in an upper surface of said indicator axle through the inside of said indicator axle to said projecting space and exits from a bottom surface of said marking device;
wherein said base member is made of porous metallic material having interlinked pores so that gas in said projecting space passes through said base member; and
wherein said cover member has a through-hole vertically extending therethrough.

3. A removable marking device for a mold comprising:
a substantially cylindrical fixed tube having relief characters on its upper surface, and said fixed tube adapted to be fixed to said mold;
a substantially cylindrical rotatable tube having relief characters on its upper surface, and the rotatable tube rotatably inserted into said fixed tube;
an indicator axle rotatably inserted into said rotatable tube; and
a base member housed in said fixed tube to support a bottom surfaces of said rotatable tube and of said indicator axle;
wherein said indicator axle includes a lower pillar and an upper pillar, the diameter of the upper pillar being smaller than the lower pillar;
wherein the inner space of said rotatable tube includes a cylindrical space configured to receive said lower pillar and a plurality of projecting spaces extending radially from said cylindrical space;
wherein said lower pillar has a fixing portion moving in and out of a peripheral wall of said lower pillar;
wherein said projecting space has a first side protruding outwardly from said cylindrical space and being parallel to a projecting direction of said fixing portion and a second side protruding from said cylindrical space and being slanted with respect to said first side;
wherein, if said indicator axle is rotated in one direction, said fixing portion makes contact with said first side of said projecting space so that said rotatable tube is rotated together with said indicator axle;
wherein, if said indicator axle is rotated in the other direction, said fixing portion is guided along said second side of said projecting space into said lower pillar so that said rotatable tube is not rotated together with said indicator axle;
wherein the peripheral wall of said upper pillar includes a contacting area making contact with an inner surface of said rotatable tube and a non-contacting area keeping away from the inner surface of said rotatable tube so that a gas flow path is formed between the peripheral wall of said upper pillar and the inner surface of said rotatable tube along said non-contacting area;
wherein said base member has a through-hole vertically extending therethrough and communicating with said projecting space; and
wherein the inner surface of said rotatable tube is provided at the upper end of said lower space with concave grooves configured to connect said gas flow path to said projecting space.

4. A removable marking device for a mold comprising:
a substantially cylindrical fixed tube having relief characters on its upper surface, and said fixed tube adapted to be fixed to said mold;
a substantially cylindrical rotatable tube having relief characters on its upper surface, and the rotatable tube rotatably inserted into said fixed tube;
an indicator axle rotatably inserted into said rotatable tube; and
a base member housed in said fixed tube to support a bottom surfaces of said rotatable tube and of said indicator axle;
wherein said indicator axle includes a lower pillar and an upper pillar, the diameter of the upper pillar being smaller than the lower pillar;
wherein the inner space of said rotatable tube includes a cylindrical space configured to receive said lower pillar and a plurality of projecting spaces extending radially from said cylindrical space;
wherein said lower pillar has a fixing portion moving in and out of a peripheral wall of said lower pillar;
wherein said projecting space has a first side protruding outwardly from said cylindrical space and being parallel to a projecting direction of said fixing portion and a second side protruding from said cylindrical space and being slanted with respect to said first side;
wherein, if said indicator axle is rotated in one direction, said fixing portion makes contact with said first side of said projecting space so that said rotatable tube is rotated together with said indicator axle;
wherein, if said indicator axle is rotated in the other direction, said fixing portion is guided along said second side of said projecting space into said lower pillar so that said rotatable tube is not rotated together with said indicator axle;
wherein the peripheral wall of said upper pillar includes a contacting area making contact with an inner surface of said rotatable tube and a non-contacting area keeping away from the inner surface of said rotatable tube so that a gas flow path is formed between the peripheral wall of said upper pillar and the inner surface of said rotatable tube along said non-contacting area;
wherein the inner surface of said rotatable tube is provided at the upper end of said lower space with concave grooves configured to connect said gas flow path to said projecting space; and
wherein said base member is made of porous metallic material having interlinked pores so that gas flows in said projecting space and passes through said base member.

5. The removable marking device for a mold described in claim 3, further comprising a cover member that closes the bottom opening of said fixed tube,
wherein said cover member has a through-hole extending therethrough and communicating with said through-hole extending through said base member.

6. The removable marking device for a mold described in claim 4, further comprising a cover member that closes the bottom opening of said fixed tube, wherein said cover member is made of porous metallic material having interlinked pores so that gas from said base member passes through said cover member.

7. A removable marking device for a mold comprising:

a substantially cylindrical fixed tube having relief characters on its upper surface, and said fixed tube adapted to be fixed to said mold;

a substantially cylindrical rotatable tube having relief characters on its upper surface, and the rotatable tube rotatably inserted into said fixed tube;

an indicator axle inserted into said rotatable tube;

a control mechanism that allows only said indicator axle to rotate when said indicator axle rotates in one direction and that allows said indicator axle to rotate with said rotatable tube when said indicator axle rotates in the other direction;

a disk-shaped base member disposed in a bottom of said rotatable tube;

wherein said control mechanism comprises:

a control space formed inside said rotatable tube; and a fixing portion that moves in and out radially and that is inserted in said indicator axle;

wherein said control space comprises:

a cylindrical space that is concentric with an axis of said rotatable tube; and a projecting space protruding radially from said cylindrical space, and said projecting space having a pair of sides extending from said cylindrical space;

wherein an imaginary line is defined between two points from which said pair of sides extending from said cylindrical space;

wherein the angle between one of said pair of sides and said line is different from the angle between the other of said pair of sides and said line;

wherein said rotatable tube is made of porous metallic material having interlinked pores so that gas flows in the upper surface of said rotatable tube through the inside of said rotatable tube to said projecting space and exits from a bottom surface of said marking device; and wherein said base member has a through-hole vertically extending therethrough and communicating with said projecting space.

8. A removable marking device for a mold comprising:

a substantially cylindrical fixed tube having relief characters on its upper surface, and said fixed tube adapted to be fixed to said mold;

a substantially cylindrical rotatable tube having relief characters on its upper surface, and the rotatable tube rotatably inserted into said fixed tube;

an indicator axle inserted into said rotatable tube;

a control mechanism that allows only said indicator axle to rotate when said indicator axle rotates in one direction and that allows said indicator axle to rotate with said rotatable tube when said indicator axle rotates in the other direction;

a disk-shaped base member disposed in a bottom of said rotatable tube; and a cover member that closes a bottom opening of said fixed tube;

wherein said control mechanism comprises:

a control space formed inside said rotatable tube; and a fixing portion that moves in and out radially and that is inserted in said indicator axle;

wherein said control space comprises:

a cylindrical space that is concentric with an axis of said rotatable tube; and a projecting space protruding radially from said cylindrical space, and said projecting space having a pair of sides extending from said cylindrical space;

wherein an imaginary line is defined between two points from which said pair of sides extending from said cylindrical space;

wherein the angle between one of said pair of sides and said line is different from the angle between the other of said pair of sides and said line;

wherein said rotatable tube is made of porous metallic material having interlinked pores so that gas flows in the upper surface of said rotatable tube through the inside of said rotatable tube to said projecting space and exits from a bottom surface of said marking device;

wherein said base member is made of porous metallic material having interlinked pores so that gas in said projecting space passes through said base member; and wherein said cover member has a through-hole vertically extending therethrough.

* * * * *